United States Patent
Henig

(10) Patent No.: US 12,491,665 B2
(45) Date of Patent: Dec. 9, 2025

(54) RIM, AND METHOD OF MANUFACTURING A RIM

(71) Applicant: DT SWISS INC., Grand Junction, CO (US)

(72) Inventor: Andreas Henig, Biel (CH)

(73) Assignee: DT SWISS INC., Grand Junction, CO (US)

( * ) Notice: Subject to any disclaimer, the term of this patent is extended or adjusted under 35 U.S.C. 154(b) by 158 days.

(21) Appl. No.: 18/064,450

(22) Filed: Dec. 12, 2022

(65) Prior Publication Data
US 2023/0182346 A1   Jun. 15, 2023

(30) Foreign Application Priority Data
Dec. 13, 2021   (DE) .................. 10 2021 006 137.3

(51) Int. Cl.
*B29C 33/22*   (2006.01)
*B29C 33/30*   (2006.01)
*B29C 37/00*   (2006.01)
*B29L 31/32*   (2006.01)

(52) U.S. Cl.
CPC ............ *B29C 33/301* (2013.01); *B29C 33/22* (2013.01); *B29C 37/0032* (2013.01); *B29C 2037/0035* (2013.01); *B29L 2031/32* (2013.01)

(58) Field of Classification Search
CPC .. B29L 2031/32; B60B 21/00; B60B 2360/36
See application file for complete search history.

(56) References Cited

U.S. PATENT DOCUMENTS

| | | |
|---|---|---|
| 4,950,438 A | 8/1990 | Nakamura et al. |
| 6,761,847 B2 | 7/2004 | Meggiolan |
| 7,858,011 B2 | 12/2010 | Reuteler |
| 7,934,778 B2 | 5/2011 | Denk et al. |

(Continued)

FOREIGN PATENT DOCUMENTS

| | | | |
|---|---|---|---|
| CN | 110254128 | * | 9/2019 |
| DE | 102010042752 A1 | | 4/2012 |

OTHER PUBLICATIONS

Wikipedia DE, Description of "Gelcoat," retrieved from https://de.wikipedia.org/wiki/Gelcoat on Nov. 6, 2020, 1 page.
(Continued)

*Primary Examiner* — Jacob T Minskey
*Assistant Examiner* — Debjani Roy
(74) *Attorney, Agent, or Firm* — Greer, Burns & Crain, Ltd

(57) ABSTRACT

A method of manufacturing a fibrous composite bicycle rim, employs a tool device having a plurality of tool components including two molding devices and one circular device. The two molding devices each have one rim flank contact surface. The circular device includes a rim well contact surface. Tool components are provided, and a first varnish coat is applied to a rim contact surface and is dried. A first fiber layer of the fibrous composite material is applied to the flank contact surface of the molding devices, forming the outer fiber layers of the pertaining rim flanks. At least one first fiber layer of the fibrous composite material is applied to the circular device which forms the rim well. The tool components of are interconnected, and the tool device is closed, is heated up, and the smooth varnish coat firmly bonds with the hardening fibrous composite material.

17 Claims, 4 Drawing Sheets

(56) References Cited

U.S. PATENT DOCUMENTS

| | | |
|---|---|---|
| 8,070,235 B2 | 12/2011 | Reuteler |
| 9,616,704 B2 | 4/2017 | Werner et al. |
| 2001/0010367 A1* | 8/2001 | Burnell-Jones ........ C09K 11/02 |
| | | 252/301.36 |
| 2004/0026986 A1* | 2/2004 | Jager ..................... B60B 21/064 |
| | | 301/58 |
| 2008/0265656 A1* | 10/2008 | Heyse ..................... B60B 1/042 |
| | | 301/58 |
| 2012/0006470 A1* | 1/2012 | Lew ......................... B60B 5/02 |
| | | 156/193 |
| 2021/0138693 A1 | 5/2021 | Kiechl et al. |

OTHER PUBLICATIONS

1 European Search Report received for Application No. 22211068.6, mailed May 15, 2023.

* cited by examiner

RIM, AND METHOD OF MANUFACTURING A RIM

BACKGROUND

The invention relates to a method of manufacturing a rim from a fibrous composite material for vehicles which as a rule are at least partially muscle-powered in use as intended, and, in particular, bicycles, and a rim manufactured by way of the method according to the invention.

The prior art has disclosed rims of fiber-reinforced plastics which allow reduction of the weight of the rims. At the same time, given a lower total weight, these rims achieve a stability comparable to, or even higher than, metal rims. A drawback of these rims is, however, the complicated manufacture since many manufacturing steps require mostly manual work, resulting in high costs. Moreover, the many manual process steps are susceptible to errors, which may increase the reject rate, thus further increasing the production costs. On the other hand, high-quality bicycle rims are not produced in large enough quantities so that developing and setting up fully automatic production would pay off.

It is therefore the object of the present invention to provide a method of manufacturing a rim from a fibrous composite material, which allows manufacturing of rims of a better quality and preferably involving a lower reject rate.

SUMMARY

The method according to the invention serves to manufacture a rim from a fibrous composite material for vehicles at least partially muscle-powered (in typical operation as intended) and, in particular, bicycles, and is implemented using a tool device. The rim is, in particular, provided for wheels equipped with a disk brake, and it does, in particular, not need a brake flank. The tool device includes a plurality of tool components. The tool components comprise two molding devices and one circular device (ring device). Two tool components, in particular, are configured as molding devices, and one tool component, as a circular device. The molding devices each comprise one flank contact surface for forming a lateral rim flank (side wall), and the circular device comprises a rim well contact surface (for forming the rim well).

The method is carried out by way of the following process steps in this or another useful sequence:

At least part of the tool components is provided, and (at least) one first smooth varnish coat is applied to at least one rim contact surface on the tool components. A rim contact surface may be e.g. a flank contact surface or the rim well contact surface.

The first smooth varnish coat (on the tool component or the tool components) is (substantially) dried.

(At least) one first fiber layer of the at least one fibrous composite material is applied to the flank contact surface of the molding devices, forming the outer fiber layers of (at least the greater part of or the mayor part of) the visible surface of the pertaining rim flanks (at the radial outer edge);

At least one first fiber layer of the fibrous composite material is applied to the circular device, which forms the rim well. The first fiber layer is, in particular, applied to the rim well contact surface.

The tool components of the tool device are interconnected, and the tool device is closed/locked;

The tool device is heated up, and the varnish coat firmly bonds with the hardening fibrous composite material;

The tool device is set and, in particular, hardened and cooled down (and opened), and the rim is removed.

The rim is thus substantially completed. Thereafter, edges may be deburred and/or spoke holes may be made. The (first) varnish coat forms a smooth surface and in the scope of the present application, it may continuously be referred to as the (first) smooth varnish coat. With reference to the invention, the term varnish coat may be amended to smooth varnish coat.

The method according to the invention has many advantages. A considerable advantage of the method according to the invention is that the varnish coats form at least part of the outermost layer. Thus, any flaws are prevented, and small and tiny inhomogeneities in the fibrous composite material are covered. In the case that some hollows or any holes appear in the fibrous composite material, they are filled up by the varnish and thus virtually invisible. Basically, the quantity of flaws or less than perfect surface spots can be substantially reduced already by the manufacturing method per se, or these kinds of spots can be (nearly) completely prevented. The reject rate may be reduced, and the quality, increased.

A considerable advantage of the method according to the invention is that the visible surfaces which in operation as intended are external, are (directly) shaped by the molding devices and formed by the smooth varnish coat, on which first fiber layers are applied. This ensures a homogeneous, reproducible full-surface placement of the fiber layers on the molding devices of the tool device.

The surface quality of the rim flanks (side walls) can be considerably further improved due to the fact that the entire visible outer surface of the finished rim preferably ensues by way of surfaces directly resting against the molding devices of the tool device. The quantity of air pockets and other defects can be significantly reduced, so as to enable noticeable reduction of the reject rate. The process is less susceptible to errors.

Any flaws of the fibrous composite material still showing or emerging are leveled by the varnish coat(s) and optically covered or filled respectively made virtually invisible. Thus, even "closer" scrutiny does not allow to detect any flaw, even if the surface proper of the fibrous composite material indeed shows minor surface roughnesses or flaws. These "cosmetic" flaws are reliably covered and can be determined only by applying extremely close scrutiny or, in particular, only with optical aids (bright lighting and/or viewing through a magnifier and/or a microscope), but not when viewing from distances of e.g. one meter.

Moreover, the coating application in the mold (in-mold coating) provides a protective layer which increases the resistance to ultraviolet radiation (from the sun) and to other environmental influences. The varnish coat moreover generates a duller surface which generates a high-quality appearance. The preferably transparent varnish coat preferably shows the structure of the fibrous composite material.

In particularly preferred configurations, the rim contact surface is configured curved in a cross-sectional plane including an axis of symmetry. The rim is, in particular, configured convex (in cross section). Preferably, the widest spot of the rim lies between the radially outwardly end of the rim (at the rim flanges) and a radially inwardly end, at the rim well.

Forming a "left-side" rim flank is preferably provided by a left-side molding device, and accordingly, forming the other, "right-side" rim flank is preferably provided by a right-side molding device. The molding devices may be configured mirror-symmetrical or identical, so that each of the two molding devices may serve for forming the "left-side" rim flank. In the case of asymmetric rims, the two molding devices are formed differently.

A fiber distortion in the fiber layers may also be reduced and largely prevented, so that the quality and stability of the rim thus manufactured is increased. The position and orientation of the fibers in the outer fiber layers is defined at all times, thus improving the stability and the visual appearance.

Preferably, the molding devices (with the flank contact surfaces) are provided, and a first varnish coat is applied to the flank contact surfaces (side wall contact surfaces) of the molding devices, forming the outer (or outermost) surface of (at least a major part of) the rim flanks of the finished rim.

Preferably, the circular device is likewise first provided with a varnish coat prior to the application of fiber layers. Preferably the circular device is formed of a number of annular segments. A varnish coat may be applied to the entire circular device or to each of the annular segments separately. At least one varnish coat is, in particular, applied to the annular segments or parts of the circular device, which varnish coat(s) provide(s) the rim well contact surface and/or the inner contact surfaces for the rim flanges. Then the entire outer surface of the rim can be provided with a varnish coating immediately out of the manufacturing mold.

In many cases, however, it is sufficient to configure a varnish coat on the outer surfaces visible in operation, i.e. on the rim base, the rim flanks (which together form the rim base as a rule) and the rim flanges most often configured radially outwardly on the rim flanks. These are the visible surfaces in normal operation. The rim well may—but does not need to—be covered by a varnish coat. The inside surfaces of the rim flanges also may—but do not need to—be covered by a varnish coat.

Preferably, at least two varnish coats are applied successively. Time intervals are preferably provided. The time intervals may be predetermined, or may depend on the conditions at the time. At any rate, there is preferably a waiting time at least until the first or previous varnish coat is dried respectively hardened. In all the configurations it is preferred to apply at least a third (and fourth) varnish coat.

It is possible and preferred for at least one varnish coat to be sprayed on. Alternately, the varnish can be brush-applied. Manual application is preferred. Alternately, automation is conceivable wherein one or more spray nozzle(s) is/are moved and controlled automatically. Generally, however, the production quantities are not high enough for automation to pay off.

In all the configurations it is preferred for the varnish coats to be applied by tool components whose temperature is between 10° C. and 80° C. or 100° C. At least one varnish coat is, in particular, applied at a tool component temperature and/or ambience temperature of at least 20° C. The temperature of the tool components during varnish coating is, in particular, less than 60° C., and particularly preferably less than 40° C. The exact temperature depends on the varnish used.

Preferably, the total thickness of the (altogether) resulting varnish coat (all of the varnish coats together) is less or thinner than 0.8 mm, and, in particular, less than 0.7 mm, and preferably less than 0.5 mm or 0.3 mm. This saves weight since the quantity of varnish applied is low. In the case of subsequent varnishing, a considerably larger quantity of varnish is as a rule applied, e.g. twice or three times the amount. The invention considerably reduces the weight. Since the rim will rotate in operation, the centrifugal mass can be clearly reduced.

The weight of the varnish applied (in total on the rim) is preferably less than 15 grams or 10 grams and, in particular, less than 6 or 5 or 4 grams. The exact quantity depends on the shape and type of the rim. Due to the larger width, a larger quantity is applied to rims for mountain bikes than to narrower, non-high, racing bicycle rims. High (racing bicycle) rims having a radial rim flank height of e.g. 60 mm, naturally take up more varnish as a rule than do narrow racing bicycle rims having a flank height of e.g. 30 mm.

Preferably, the final weight or dry weight of the resulting varnish coat is (altogether) less than 10 grams or 7 grams. Preferably, the weight ratio of the dry weight of the resulting varnish coat relative to the total weight of the rim is less than 1.5%, or less than 1.25%, or even less than 1%.

Particularly preferably, at least one varnish coat is applied by at least one spray nozzle. A spray gun may e.g. be used. The motion speed and the diameter of the spray nozzle(s) may be adapted or optimized.

It is possible and preferred to use at least one varnish taken from a group of varnishes including 1-pack and 2-pack varnishes, gel coats, varnish coats based on isophthalic acid and/or neopentyl glycol, polyurethane coating, acrylic finishes, and other varnishes or paints. The surface is particularly preferably configured smooth.

These varnishes (e.g.—though not only—based on isophthalic acid and/or neopentyl glycol) may show high or very high hydrolytic stability. These and other varnishes may also fulfill high or highest requirements for UV stability and gloss level retention. Also possible is to use 1-pack and 2-pack varnishes, in particular, 2-pack polyurethane coating or the like. These varnishes allow the coating of fiber-reinforced plastic components in the negative mold.

These varnishes allow to generate covalent bonds with any epoxy-, laminating-, infusion- and top layer resin. This generates composites showing very high layer adhesion. The varnish may be configured super transparent, so as to turn e.g. the carbon parts visible.

In all the configurations it is possible for the or at least one of the varnish coat(s) to be at least partially or completely pigmented. It is possible and preferred to apply and/or incorporate a pattern e.g. by means of two or more spray nozzles. For example a color pattern, which is visible on the finished rim, may be incorporated or applied. Such a pattern may serve design purposes or enhance recognition. The pattern or one of the patterns may also show e.g. model designations or manufacturer's data or a design or a (registered) trademark. The pattern may include text or graphic symbols.

For hardening the fibrous composite material and for bonding the fibrous composite material with the varnish coat, the tool device is preferably temperature-controlled to between 50° C. and 180° C., and, in particular, between 100° C. and 150° C.

In all the configurations it is preferred for the surfaces of the molding devices to be (at least partially) structured. This structure may be configured as a micro structure and form a (slight) surface roughness having a profile height of 1 μm or 2 μm or 5 μm. These measures allow to provide a (high-quality) matte surface structure, the visual appearance of which is highly attractive.

In preferred specific embodiments, the following steps are carried out in addition, in this or another useful sequence:
After applying the varnish coat(s) to the tool components, one molding device of the two molding devices is selected and provided, and the first fiber layer of the fibrous composite material is applied to the flank contact surface of the selected molding device, which, constituting a visible layer, forms at least a major portion of the visible surface of the pertaining rim flank.

The other of the molding devices is provided and (at least) a first fiber layer of the fibrous composite material is applied to the flank contact surface of the other of the molding devices, which, constituting a visible layer, forms at least a major portion of the visible surface of the other of the rim flanks.

At least one first fiber layer of the fibrous composite material is applied to the circular device, which comprises a circumferential rim well contact surface which forms the rim well (or at least a part thereof).

The circular device is placed against one of the molding devices, and the other molding device is placed against it, and the circular device and the molding devices are connected with one another.

This allows manufacturing of a particularly attractive rim. The improved visual appearance of the manufactured rim thus provides the opportunity to manufacture the rim "out of the mold". The clearly defined shape and position of the fiber layers and the fibers contained therein allow to greatly reduce flaws in the hardened rim.

In contrast to this, the prior art discloses methods wherein fiber layers are firstly inserted in an auxiliary tool. A bundle of fiber layers thus premolded is then transferred to, and inserted in, the tool proper. During transfer of the fiber layers, some fibers and fiber layers may be displaced, so that the position and shape of each of the fiber layers is not always reproducible. However, thus far the method has been carried out in this way among other things since the tool proper is so heavy that it cannot readily be transported manually by one person (or several persons). With the invention, however, one single person can readily transport each of the parts of the tool device separately. This is why at any rate the visible layers and also the reinforcement layers can be directly placed in the mold.

Preferably, the fiber layers are inserted in the tool units, and the outer layers visible on the finished rim are pressed directly against the tool units. Preferably, each of the molding devices form the entire visible region of the rim flanks. The circular device preferably forms the visible region of the rim well.

In a preferred specific embodiment, the fiber layers are pressed against the molding devices of the tool device, to ensure full-surface contact between the fiber layers and the flank contact surfaces. This avoids air pockets and flaws, and thus enhances the quality.

In particularly preferred specific embodiments, all the fiber layers, which in use as intended, as visible layers, form the outer surfaces visible (through the varnish coat which is, in particular, at least partially transparent), are pressed against the molding devices and the circular device of the tool device, to ensure full-surface contact between the fiber layers and the flank contact surfaces. This improves the structure and the quality.

Refinishing work to the visible surface and, in particular, re-varnishing the outer surface after removal from the tool device to cover up air pockets and other flaws can be avoided. This results in a particularly advantageous method. The fact that the visible surfaces do not require any re-varnishing, saves another method step, thus reducing the costs. It is another considerable advantage that the total weight of the rim is reduced since the weight of a layer is omitted.

In particularly advantageous configurations, an auxiliary molding part of the tool device is used. An auxiliary molding part of the tool device matching the selected molding device is connected with the previously selected molding device, so that the (selected) molding device together with the auxiliary molding part forms a (shared) mold surface for the rim base circling the axis of symmetry of the rim. The mold surface for the rim base is configured in sections on the selected molding device and in sections, on the auxiliary molding part. The auxiliary molding part is not varnish-coated. Due to the low thickness of the varnish coats there is virtually no vertical offset on the point of contact with the selected molding device, or it does not interfere, since this is where the first fiber layer of the other molding device is placed later. Alternately, the vertical offset is taken into account when lining the molding parts.

In this configuration, the first fiber layer is not only applied to the flank contact surface of the selected molding device, but the first fiber layer is (integrally) also applied to the rim base region of the auxiliary molding part, so as to form a continuous first fiber layer in the region of the rim base. This continuous first fiber layer does not only extend over the rim base region of the (selected) molding device, but also over the rim base region or rim base mold region of the auxiliary molding part. Thus, the first fiber layer is preferably continuously applied to the flank contact surface of the selected molding device and to the rim base region of the auxiliary molding part, so as to provide a continuous and integral first fiber layer in the region of the rim base. These specific embodiments allow to manufacture a particularly robust and high-quality rim.

In preferred specific embodiments, the auxiliary molding part is then removed from the selected molding device, and (immediately thereafter or preferably later) the two molding devices covered with fiber layers are connected with one another. For removing the auxiliary molding part, particular care is taken so that the draped fiber layers in the region of the rim base retain their shape (approximately or at least substantially). The sections of the fiber layers protruding from the selected molding device in the region of the rim base, together with the fiber layers placed on the other of the molding devices, form the other of the rim flanks. The "protruding" sections, however, do not form a visible surface on the finished rim.

It is preferred that after removing the auxiliary molding part, the circular device is placed first, and thereafter, the other molding device is placed.

In simple configurations, the selected molding device is placed on a table which is for example horizontal, for laying fiber layers, and the first fiber layer and optionally further fiber layers are placed on the flank contact surface of the selected molding device and optionally on the auxiliary molding part, and pressed against the pertaining contact surfaces. In parallel or thereafter or before, the other of the molding devices is for example placed on an e.g. horizontal table, and a first fiber layer is laid on the other of the molding devices, and optionally, further fiber layers are placed on the other of the molding devices.

The circular device may be covered with the fiber layers in parallel or before or after. After removing the auxiliary molding part, the circular device is placed on the selected molding device with the fiber layers placed on the rim well contact surface. Thereafter, the other of the molding devices with the placed fiber layers may be placed on the selected molding device and the circular device. Given this configuration, each of the molding devices is placed step by step on a horizontal table. Alternately it is possible for the table to be disposed at an angle to the horizontal, or for the molding devices to be positioned vertically in the space, and for the fiber layers to be pressed against the pertaining molding devices from the side.

In preferred specific embodiments, the first fiber layer placed on the selected molding device forms the visible layer with the visible surface of the pertaining rim flank in the region of the flank contact surface, and in the rim base region of the auxiliary molding part, a reinforcement layer of the rim base, but not the visible layer with the visible surface of the other of the rim flanks. This achieves an advantageous connection of the two halves. The two halves of the rim may be configured symmetrically or asymmetrically.

Preferably, the visible rim base is formed by the radially inwardly regions of the rim flanks, respectively by the radially inwardly regions of the first fiber layers which are placed on the selected molding device respectively the other of the molding devices.

In advantageous configurations, the two molding devices and the auxiliary molding part each comprise a mold parting surface or contact surface running perpendicular to the axis of symmetry of the rim. Each of the molding devices and the auxiliary molding part can be selectively placed against one another at the contact area (of the mold parting surface). Thus, the auxiliary molding part is preferably first placed against the selected molding device, and removed after placement of the appropriate fiber layers. Thereafter, the other of the molding devices with the pertaining mold parting surface is placed against the mold parting surface of the selected molding device.

Preferably, at least one reinforcement layer is inserted in the interconnected molding devices (at least in the region of the rim base).

A method omitting the use of an auxiliary molding part is likewise conceivable. Then, the molding devices are first covered separately, each with first fiber layers as the visible layers. Thereafter, the two molding devices may be joined, and at least one reinforcement or joint layer may be placed on the rim base from radially outwardly. Thereafter, single annular segments covered with fiber layers might be inserted from the outside, which are thereafter carefully removed, leaving the placed fiber layers. Thereafter, a circumferential, outer fiber layer might be placed, and the annular segments could be reinserted and connected to the circular device. Thereafter, hardening may be carried out.

What is particularly preferred is a sequence of method steps wherein the auxiliary molding part is placed on the selected molding device, the auxiliary molding part is removed after placing first fiber layers, and the circular device with the fiber layers previously placed thereon, is placed. Finally, the other of the molding devices with the fiber layers placed thereon is placed.

In all the configurations it is preferred for rim flanges to be configured on the two rim flanks. In particular, at least one rim flange is at least partially formed by fiber layers, which are placed on one of the molding devices and on the circular device. This means that a rim flange is preferably formed both by fiber layers placed on a molding device, and also by fiber layers placed on the circular device. This increases stability.

In advantageous specific embodiments, at least one roving is inserted for reinforcement in the region where the rim well intersects the rim flank. This roving may consist of a plurality of filaments, or of a bundle of filaments, or may comprise filaments. Alternately it is possible to use for rovings, for example braided filaments or corded or twisted filaments. These inserted rovings can reinforce the crossing regions between the rim well and the rim flank and the rim flange.

In all the configurations it is preferred for the circular device to comprise, in the peripheral direction, at least two and, in particular, three or more annular segments. Particularly preferably, there are three annular segments in the peripheral direction. It is also possible to use two annular segments only, extending over an angle of 180° each. Preferably, three annular segments are used, so that each of the annular segments extends over an angle at circumference of clearly less than 180°. Preferably, the annular segments are configured identically, so that in the case of three annular segments, each preferably covers an angular range of 120°. It is also conceivable for each of the annular segments to extend over different angular ranges. The annular segments all together extend over the entire circumference.

Preferably, the circular device comprises, in the axial direction (parallel to the axis of symmetry of the rim) transverse to the peripheral direction, at least two and, in particular, three or more annular segments. It is thus possible for the circular device to consist of nine annular segments in total. Each three annular segments together form a ring. The three rings (having three annular segments each) are disposed sequentially in the axial direction. The annular segments may be disposed at an offset in the axial direction. The annular segments in total form the circular device, which radially inwardly forms the rim well contact surface.

The axially central annular segments may, in particular, be configured in a wedge shape. This allows a first removal of the central annular segments after manufacture. Thereafter, the other annular segments may be removed, which for example form an undercut on the rim flanges, to provide radially inwardly protruding ends of the rim flanges.

Alternately it is conceivable for the axially central annular segments all together to form a disk-shaped ring instead of a wedge shape. Also in this case, the axially outwardly annular segments may form an undercut on the rim flanges.

In advantageous configurations, a locking ring is provided, which is placed outwardly around the interconnected molding devices and the circular device. The locking ring may be placed radially from the outside, reinforcing the coherence between the components. In this respect, the locking ring may be referred to as an external clamping ring. It is also possible to omit a locking ring, in particular, if the molding devices and the circular device can be interconnected in another way.

Preferably, the tool device loaded with the fiber layers is evacuated prior to hardening. Particularly preferably, the tool device is inserted into a pressure device and/or heated. This can aid in the setting or hardening of the fibrous composite material.

In all the configurations it is particularly preferred to use fiber layers impregnated with at least one resin. These fiber layers provided or impregnated with matrix material (in particular, resin) may also be referred to as prepregs, and may preferably contain a quantity of matrix material (and preferably of resin) that is (at least substantially) sufficient for hardening. The use of prepregs is particularly advantageous. It is also conceivable to (additionally) insert matrix material or resin material into the completely loaded tool device. For example, matrix material or resin material may be injected or aspirated. It is also possible to use for prepregs, fiber layers, fiber mats, woven mats or the like, and to additionally insert (some) resin material.

In all the configurations it is preferred to insert an inflatable tube (into the region of what is to be the hollow space), before connecting the molding devices with the circular device. Preferably, the tube is inflated after fastening the molding devices to the circular device. An outwardly connection for inflating for example forms the valve opening intended for later. This allows subsequent removal of the tube.

It is preferred to insert spoke holes after removing the rim from the tool device.

Another method according to the invention serves to manufacture a rim for at least partially muscle-powered vehicles and, in particular, bicycles. It involves inserting fiber layers in tool units. The outer surfaces tangible on the finished rim are formed by a varnish coat applied to the tool units, which firmly bonds with the fiber layers in hardening. What is "visible" per se is, the outer fiber layer, since as a rule the varnish coat is configured at least partially transparent.

Preferably, the fiber layers are inserted in the tool units after applying the varnish coat. Then, what are the external or visible, outer layers on the finished rim, are pressed immediately (indirectly) against the tool units, (respectively strictly speaking, directly against the varnish coat). This allows manufacturing of an advantageous rim, which does not require any, and at any rate no substantial, refinishing work of the (visible surface of the) outer rim.

In all the configurations, the tool components are firstly prepared, i.e., in particular, cleaned, prior to applying the varnish coat(s) to the tool components. Additionally to usual preparations, the spots not intended to be varnished are, in particular, covered by covering units (such as e.g. adhesive tape or adhesive labels or the like).

Furthermore, the intended varnish is prepared according to data sheets, e.g. stirred or mixed.

Preferably, first a sprayable in-mold primer for fiber-reinforced components (e.g. on an epoxy basis) is applied. It is mixed e.g. in a ratio of 100:10. The layer thickness of the primer, in particular, applied by spraying may, in particular, be between 40 and 200 μm.

When applying the varnish coat, three thin layers are, in particular, applied to the cold mold (20° C.) with a (commercially available) spray gun. The inlet pressure may be e.g. between 2 and 3 bar, in particular, 2.5 bar. The spray nozzle may, in particular, have a diameter between 0.5 mm and 4 mm, in particular, between 1 mm and 2 mm. A nozzle of 1.5 mm diameter has shown good results.

Preferably, the first two layers are applied in a spray mist, the third layer is, in particular, applied totally covering. An advantageous waiting time between layers is ca. 5 min. The varnish is hardened, in particular, at 60° C. in a pressure device (presently primarily serving for heating). Heating with other means is conceivable as well.

After the tool device ("mold") has cooled in the air, optionally with convective aid, the fiber layers are placed. This is followed by hardening and demolding.

A rim according to the invention for at least partially muscle-powered vehicles and, in particular, bicycles comprises opposite rim flanks, a rim well and a rim base, where the rim flanks meet, in particular, in the radially most inwardly point. The rim is manufactured of at least one fibrous composite material by means of a method as described above. In a preferred specific embodiment, the outermost surface visible in operation as intended, consists at least predominantly or completely of the at least one fibrous composite material. This is true, apart from any rim eyelets and model designations, and e.g. stickers which are small compared to the rim surface, wherein the factor of the surface for example of stickers to the rim surface is less than 1/5 or 1/10 or 1/100. The outermost layer and the tangible outer layer are formed by a varnish coat.

The rim according to the invention is very advantageous and provides a high surface quality and a reproducible, high quality, even without finishing processes of the outside surface, and, in particular, without subsequent varnishing of the outside surface following removal from the tool device.

The tool device according to the application serves to manufacture a rim for at least partially muscle-powered vehicles and, in particular, bicycles, the rim comprising opposite rim flanks, a rim well and a rim base, where the rim flanks meet, in particular, in the radially most inwardly point. The tool device comprises a number of tool components, including two molding devices and one circular device. The molding devices each comprise contact surfaces for forming one rim flank each. The circular device comprises a plurality of circumferentially composed annular segments. The radially inwardly region of the circular device shows a contact surface for forming the rim well.

The tool device is very advantageous and provides the option of manufacturing high-quality, reproducible rims, in particular, for bicycles.

Particularly preferably, the molding devices and/or the circular device consist of a light metal, and they are, in particular, manufactured and/or finished by chip removal. The contact surfaces of the molding devices and/or their units with the manufactured rim are preferably polished. Once again this increases the quality of the manufactured rim. Alternately, an intentional surface roughness is feasible.

The circular device may, in particular, comprise an annular unit (with a core) of a less elastic material, and at least one ring cover of a more elastic material. Then, the ring cover forms the contact surface or at least part of the contact surface for forming the rim well. The molding devices, in particular, also comprise a core of a less elastic material than does the ring cover. This allows the ring cover to yield elastically, and to build up and transmit the required pressure to the side walls and the rim flanges and/or the rim well. At least part of the ring cover, in particular, consists at least partly of a rubber elastic or elastomeric material. Particularly preferably, the ring cover consists at least partially, or substantially, or nearly completely, or completely, of a silicone. Using silicone elastomerics, polyurethanes, or at least a silicone rubber is (also) possible. The annular unit or the core of the annular unit preferably consists substantially or (nearly) completely of at least one metallic material.

The tool device, in particular, comprises at least one auxiliary molding part, which, together with one of the molding devices, forms a mold surface for forming out the rim base. It is also possible to provide one auxiliary molding part for each of the two molding devices. Then, one of the molding devices may optionally be used with the matching auxiliary molding part. The auxiliary molding part may be adapted in its dimensions so that, after applying the varnish layers or varnish coats on the pertaining molding device and connecting the molding device with the auxiliary molding part, a smooth (and continuous) surface is established in the region of the rim base. It is, in particular, also possible and preferred for the auxiliary molding part to show a minor recess, so as to leave some room for the outermost fiber layer on the other of the molding devices.

It is possible and preferred for the molding devices and/or the circular device and/or the auxiliary molding part to show alignment units corresponding to one another. This reproducibly ensures alignment of each of the molding devices with the circular device, respectively with the auxiliary molding part, to one another. For attaching the molding devices and the circular device respectively the auxiliary molding part to one another, appropriate fasteners are, in particular, provided, which can be mounted to corresponding attachment openings or to the alignment units. For example, screws, pegs, rivets, clamps or detent mechanisms or the like can be used for fasteners.

In all the configurations it is preferred for each of the molding devices and the circular device to have a weight of less than 35 kilos and, in particular, less than 30 kilos or less than 25 kilos and particularly preferably, less than 20 kilos or 15 kilos. At least one molding device, in particular, has a weight of less than 15 or less than 12 or less than 10 kg. When assembled, the two molding devices and the circular device preferably have a total weight of less than 35 kilos or less than 30 kilos or even less than 20 kilos. This would permit one person to move each of the units and the entire tool device alone, and without requiring the help of another person. Comfortable handling for two persons is feasible at any rate. This facilitates the manufacture.

The fact that the tool device comprises compact molding devices and a compact circular device, which parts are manufactured by turning or milling, quite considerably reduces the manufacturing costs for a tool device. This allows employment of a larger quantity of tool devices for production in parallel. Rims can be manufactured in a higher quality, generating lower costs, and moreover requiring minor refinishing of the visible surfaces or none at all.

Further advantages and features of the present invention can be taken from the exemplary embodiments which will be discussed below with reference to the enclosed figures.

DETAILED DESCRIPTION

Figure 1:
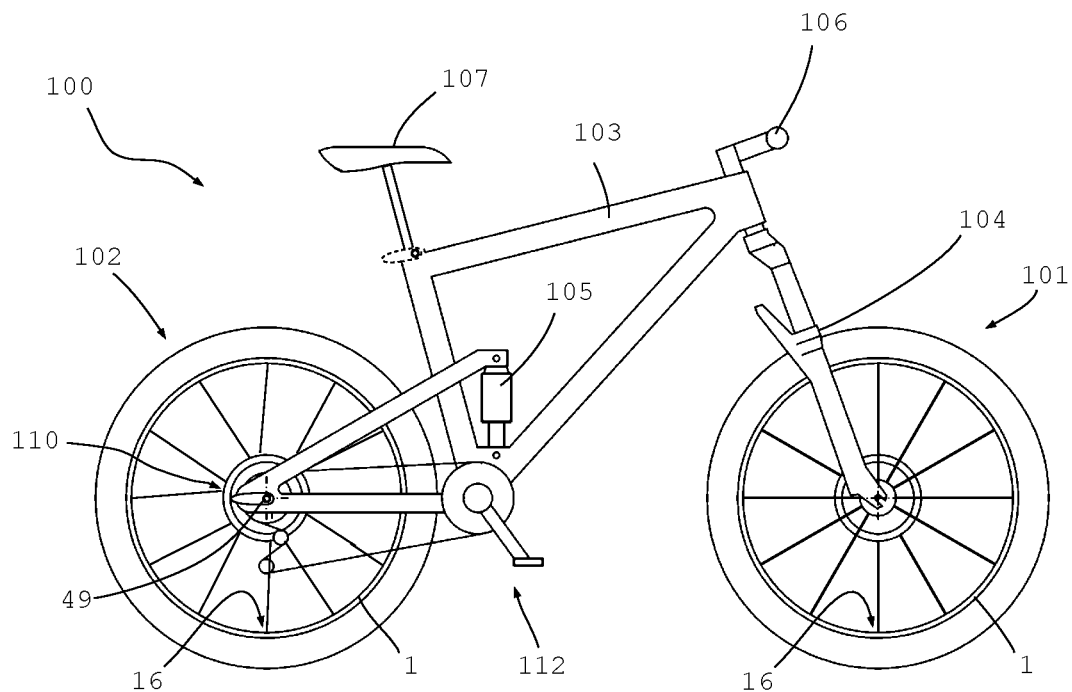
FIG. 1 a schematic illustration of a mountain bike with rims according to the application.
Figure 2:
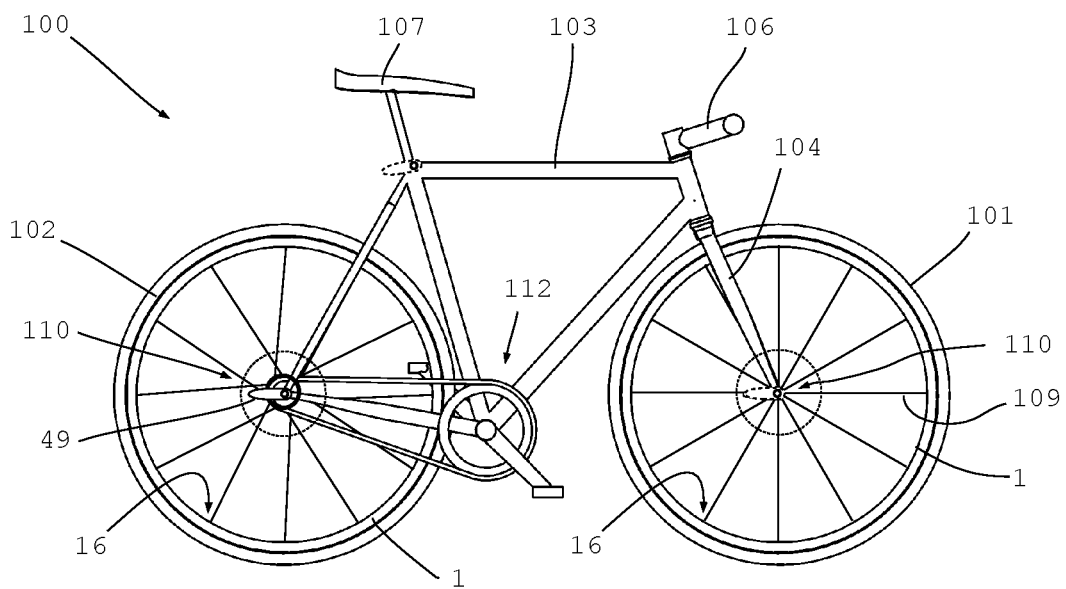
FIG. 2 a schematic illustration of a racing bicycle with rims according to the application.

The FIGS. 1 and 2 each show a mountain bike respectively racing bicycle 100, each equipped with rims 1 according to the application. The mountain bike respectively racing bicycle 100 is provided with a front wheel 101 and a rear wheel 102, where rims 1 according to the application are employed. The two wheels 101, 102 are provided with spokes 109 connecting the rim 1 with the hubs 110. To this end, the rim 1 is provided with spoke holes 16.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving.

Optionally, an electric auxiliary drive may be provided on the pedal crank 112 and/or the wheels. The hubs 110 of the wheels may be attached to the frame by means of a clamping system 49 (for example a through axle or a quick release).

Figure 3:
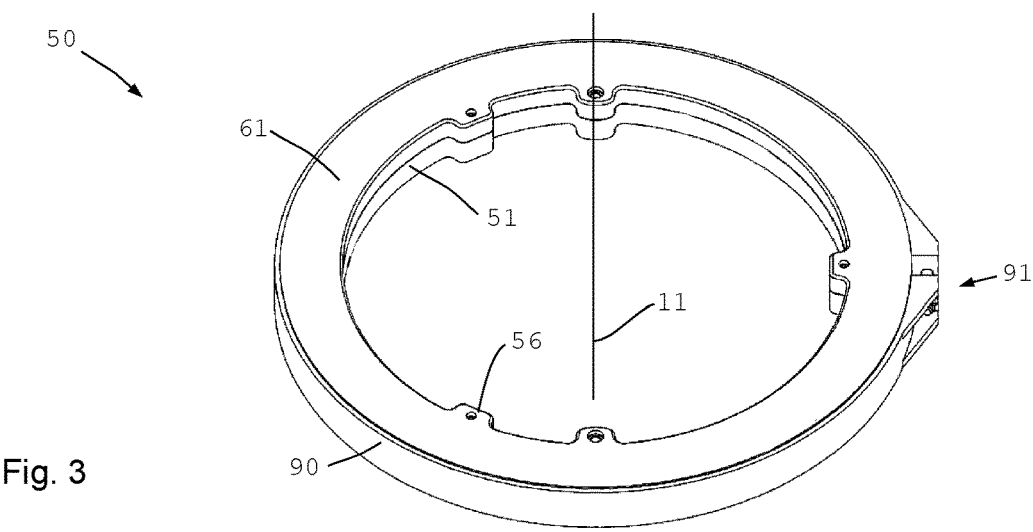
FIG. 3 a schematic total view of a tool device according to the application for manufacturing a rim according to the application.

FIG. 3 shows the tool device 50 in the assembled state with the fiber layers already inserted to manufacture the rim 1, prior to inserting the tool device 50 into a separate pressure device, in which the tool device 50 is also heated to accelerate the hardening of the fibrous composite material. The tool device 50 is substantially configured rotationally symmetrical around an axis of symmetry 11, which at any rate forms an axis of symmetry for the finished rim 1.

Figure 4:
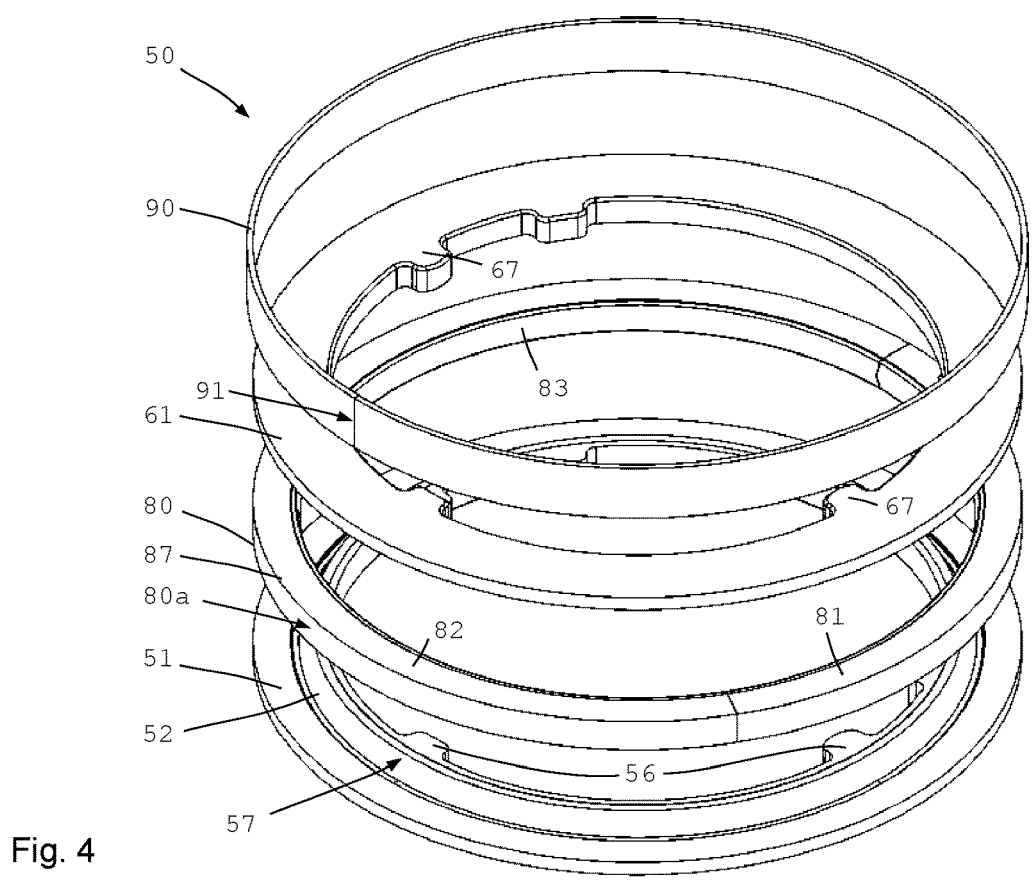
FIG. 4 an exploded view of the different components of the tool device according to FIG. 3.

FIG. 4 shows an exploded view of the tool device 50, at the top of which a locking ring 90 is illustrated that is provided with a clamping portion 91 and a screw, not visible. The locking ring 90 may be placed around the further components of the tool device 50, and may serve as a clamping ring. Optionally, this locking ring 90 may be omitted.

The bottommost component illustrated is a molding device 51, including a flank contact surface 52 which serves to form one of the two rim flanks of the rim 1 manufactured. The molding device 51 shows fasteners 56 and configured or disposed thereat, alignment units 57, to which the molding device 51 with the circular device 80 and the other of the molding devices 61 is fastened by means of appropriate fasteners 56, or to the alignment units 57. The circular device includes alignment units 87, and the other of the molding devices 61 includes alignment units 67.

As can be seen in FIG. 4, the circular device 80 or ring device 80 consists of a number of annular segments 81-83 extending in the peripheral direction around the central axis of symmetry 11. This allows separate removal of the annular segments.

Figure 5:
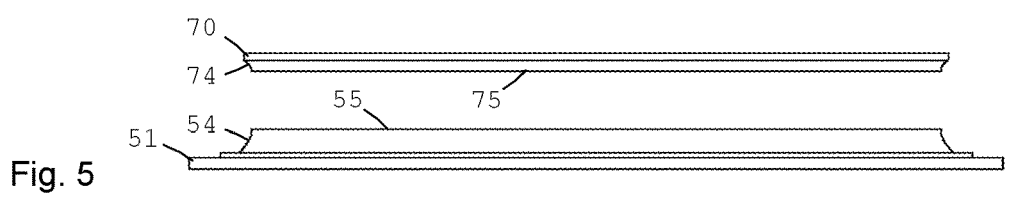
FIG. 5 a molding device and an auxiliary molding part of the tool device according to FIG. 4.

FIG. 5 shows a molding device 51 and the pertaining auxiliary molding part 70, which are interconnected to cover the flank contact surface 72 and the rim base regions 54 and 74 with fiber layers of the fibrous composite material. In this way, the region of the rim base is reinforced by one joint, continuous layer.

The molding device 61 and the auxiliary molding part 70 are interconnected with, respectively placed on top of, one another on the mold parting surfaces 55 and 75.

Figure 6:
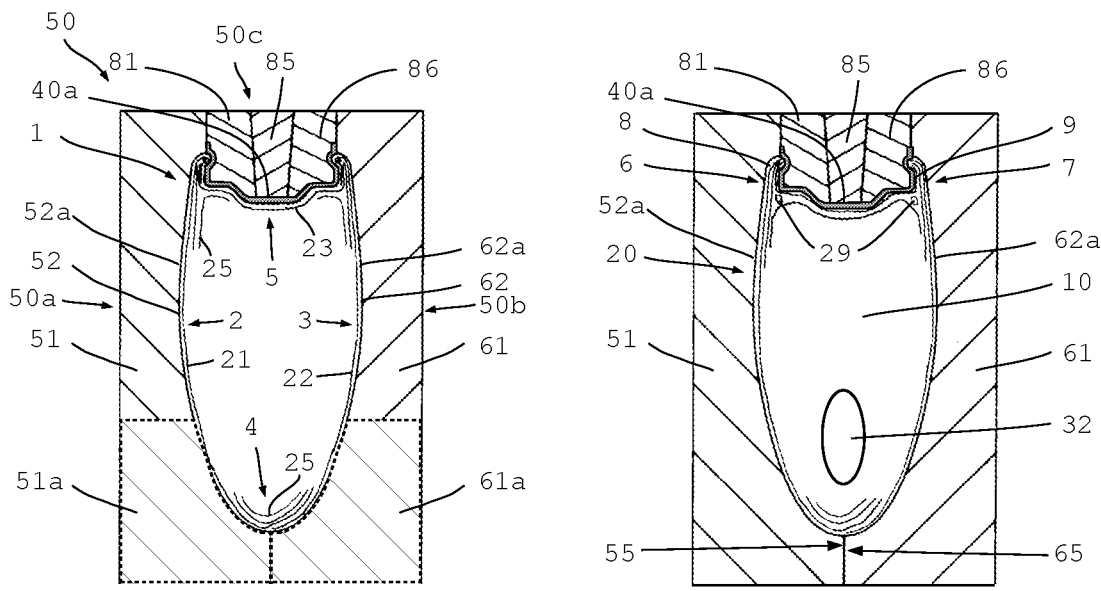
FIG. 6 two sectional views of the tool device while manufacturing a rim.

FIG. 6 shows two schematic illustrations of the tool device 50 and fiber layers 21-23 and 25 disposed therein. The tool device comprises tool components 50a, 50b and 50c and in the assembled state substantially consists of a first molding device 51, a second molding device 61, and the circular device 80, which in turn consists (in the peripheral direction) of a number of annular segments 81-83 (see FIG. 4) and (in the axial direction) annular segments 85, 86.

Optionally, the molding devices 51 and 61 may be configured multipart and may for example additionally comprise molding parts 51a and 61a. Preferably, however, each of the molding devices 51 and 61 is configured as one piece. The molding device 51 has a flank contact surface 52 for the rim flank 2 on the left, while the rim flank 3 on the right is formed by a (side wall) flank contact surface 62. The flank contact surfaces 52 respectively 62 are covered with fiber layers 21 respectively 22. Reinforcement layers 25 are also applied in the region of the rim base 4. The rim well 5 is formed by at least one fiber layer 23, which is applied radially inwardly on the circular device 80.

The two rims 1 illustrated in FIG. 6 are each provided with rim flanges 6, 7, which are configured by fiber layers 21, 23 and 25. The outer surfaces 8 and 9 of the two rim flanks 2, 3, which will later be visible from the outside, are each formed by the first fiber layer 21 placed on the flank contact surface 52 and by the first fiber layer 22 placed on the flank contact surface 62. The visual range of the rim well is formed by the first fiber layer 23 placed on the circular device 80.

Following manufacturing respectively hardening a first respectively the previous rim, the rim is removed from the tool device 50. Then, the tool device 50 shows e.g. a temperature of 25° C. or 30° C. and may be left open for several minutes to cool down (e.g. 10 to 30 minutes). After cleaning and preparing including application of a primer coat if any, a first varnish layer (coat) is sprayed on (nebulized), preferably at (approximately) room temperature. Following a short hardening period (e.g. 5 to 10 minutes), two further varnish layers (coats) are preferably applied. Optionally, the tool device 50 may be heated up to a temperature of 40° C. or 60° C. or 80° C. However, hardening is also feasible "in air" at room temperature. Hardening may take between 1 minute and 15 minutes, depending on the temperature. Optionally, a (gentle) airflow may be used for assistance.

Rims are preferably manufactured (in particular only) for use with disk brakes. In particular, only the outer surfaces visible in the subsequent regular operation as intended are varnished. The rim flanks are preferably varnished up to the outside tips of the flanges. Basically, the surface in the region of the rim well may be varnished as well. The surface of the shape may be (slightly) roughened e.g. by way of laser structuring. Anodizing the rim contact surfaces of the tool device may also effect a matte surface of the rim flanks (often desired).

The varnish layers or coats 52a, 62a are, in particular, applied prior to assembling the tool device 50 from the tool components 50a, 50b and 50c respectively the molding devices 51 and 61 and the circular device 80. For these, varnish coats 52a, 62a are sprayed onto the flank contact surfaces 52, 62 preferably separately, respectively application is done singly. The resulting varnish coats are thin enough so as to be invisible in the scale of the FIG. 6 (which is not true to scale), but they are virtually thin lines. The resulting layer thickness is as a rule less than 0.5 mm. Preferably, several varnish layers are applied and form a varnish coat.

While the rim 1 is hardening, the varnish coats are transferred from the mold and firmly bond with the fibrous composite material. Thus, the rim 1 is finally removed together with the adherent varnish coat.

The "visible surfaces" respectively tangible surfaces, which are outside in operation, are formed by the varnish coats which as a rule are at least partially transparent. Thus, all the visible surfaces respectively all the visible layers of the finished rim 1 are provided by the fiber layers 21-23, each of which is applied separately and full-surface on the molding devices 51 and 61, and the circular device 80. This achieves a particularly high surface quality, since air pockets or other flaws can be avoided better than in the prior art.

To allow to apply pressure from the inside during hardening, a tube 32 (shown schematically only) is as a rule inserted, which can be guided outwardly through what is intended as the valve opening, and on which pressure can be applied after closing the tool device 50, to press each of the fiber layers 21-25 from the inside against the inner walls of the tool device 50. This secures a reliable composite. The tube 32 may be configured elastically, expanding when inflated. It is likewise possible and preferred for the tube 32 to be of sufficient size or matching configuration and with insertion, to be placed full-surface on at least one flank contact surface, and radially from the inside, placed full-surface on the circular device.

The ring device 80 or circular device may comprise an annular device 80a forming a core 80a (of a less elastic material) and (at least) one ring cover 40a of an elastic material such as a rubber material or a silicon material, disposed in the region of the side walls and the rim flanges and of the rim well, and applying pressure on the rim walls being formed. This may enhance the quality.

Optionally it is possible, as can be seen on the right in FIG. 6, to insert peripheral rovings or fiber bundles in the intersection of the rim flank with the rim well, to reinforce those regions and configure them still more robust.

Figure 7:
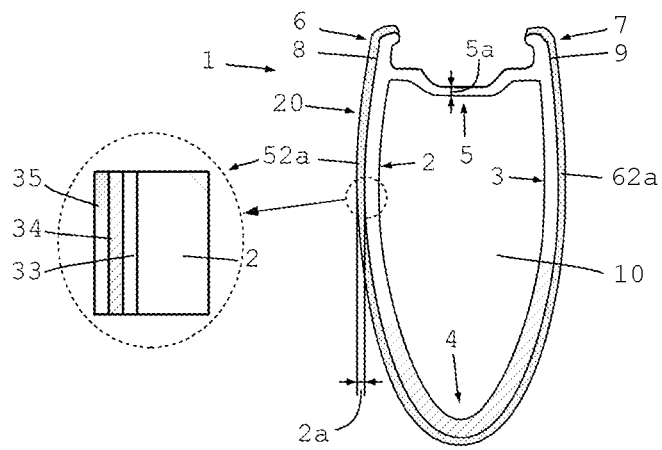
FIG. 7 a schematic cross-sectional view of a finished rim according to the application.

FIG. 7 shows a simplistic illustration of a finished rim 1, which is not illustrated to scale. The rim 1 includes a rim base 4, a rim well 5, and rim flanks 2, 3, on which rim flanges 6, 7 are configured. In the outside region of the rim flanks, the resulting varnish coats 52a, 62a, which were transferred from the manufacturing mold to the rim, are illustrated enlarged and hatched. The varnish coat 52a may consist of a number of varnish layers or varnish coats 33-35 subsequently transferred to the tool components 50a, 50b, which together result in the resulting varnish layer thickness 2a or total varnish coat thickness 2a (on the rim flank 2). Resulting layer thicknesses of the varnish coat between approximately 0.2 mm and 0.7 mm are typical. Most frequently, a resulting layer thickness of approximately 0.3 mm to 0.5 mm is preset. A hollow space or hollow section 10 can be seen in the interior. The rim 1 is manufactured by way of a method according to the application and a tool device according to the application, of at least one fibrous composite material.

Figure 8:
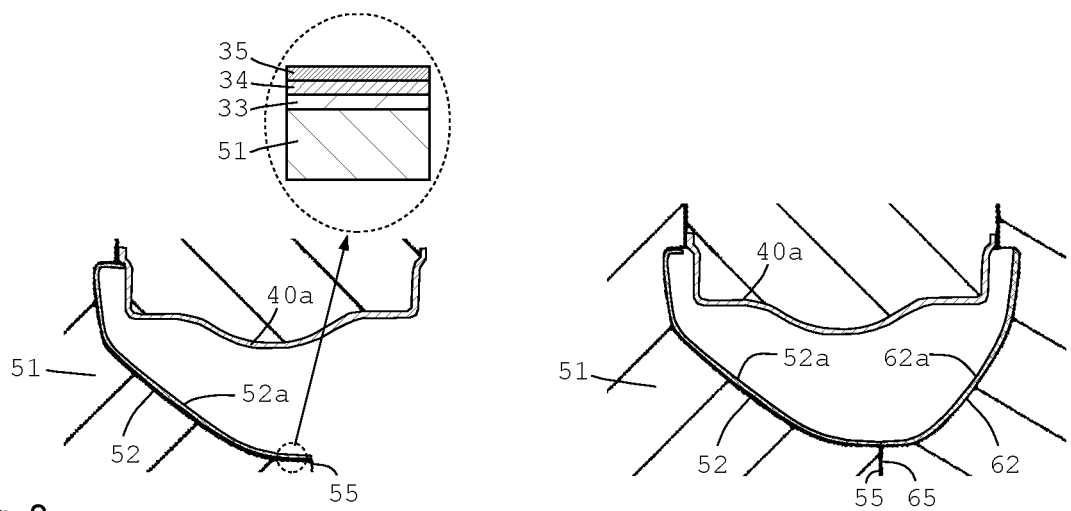
FIG. 8 two sectional views of the tool device.

FIG. 8 shows two simplistic illustrations of the tool device 50 with the tool components 50a, 50b and 50c during manufacture. A number of varnish coats or varnish layers 33, 34 and 35 have been subsequently applied to the flank contact surfaces 52 and 62 of the molding devices 51 and 61, all together resulting in a varnish coat 52a on the flank contact surface 52 of the molding device 51. The other of the molding devices 61 in the region of the flank contact surface 62 is likewise coated correspondingly. The circular device 80 or the ring cover 40a of the circular device 80 is optionally also provided with a varnish coat, which is transferred to the walls of the rim during hardening.

Figure 9:
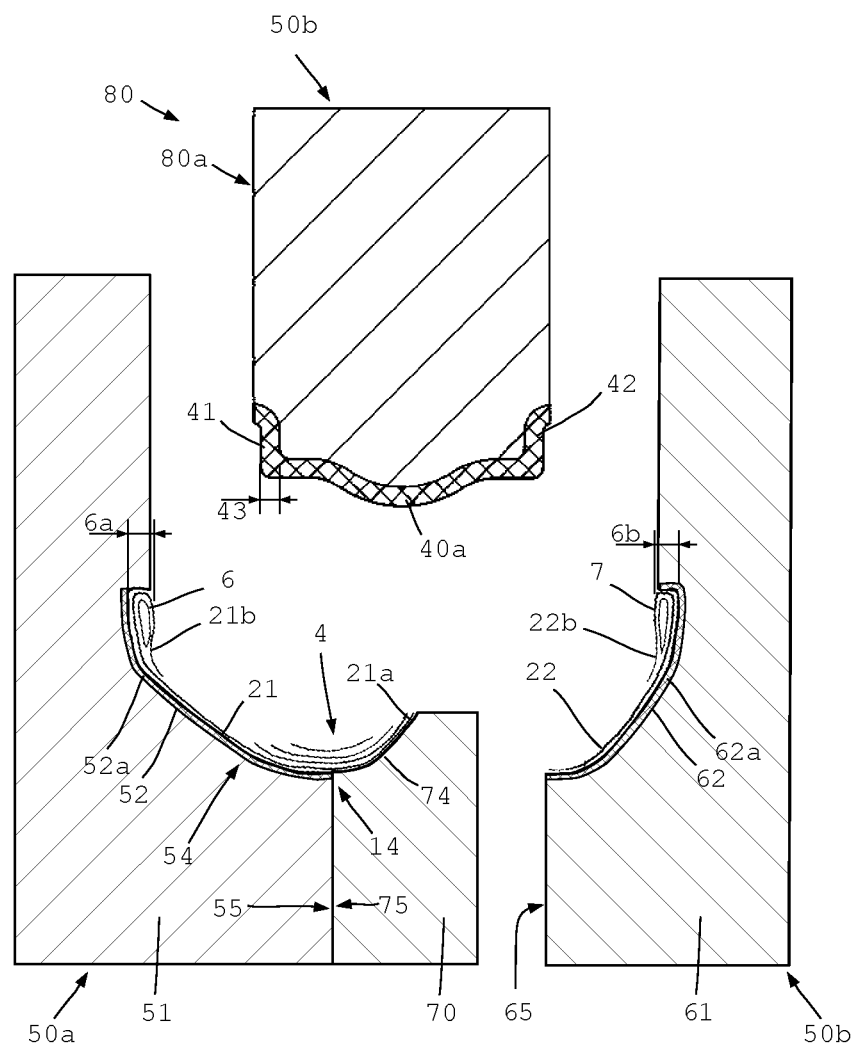
FIG. 9 different sectional views while manufacturing the rims according to the application.

FIG. 9 shows a simplistic illustration of the fiber layers on a tool device 50, wherein the outlines and the positions of the fiber layers 21-23 and 25 are shown intentionally roughly to give an illustrative example of the outlines of each of the fiber layers. It can be seen that the fiber layer 21 was not only placed onto the flank contact surface 52 of the molding device 51, but also onto the rim base region 74 of the auxiliary molding part 70, to later form a reinforcement section 21a in the region of the rim well contact surface 62 of the other of the molding devices 61. Thus, an overlap of each of the fiber layers is enabled from one of the rim flanks to the other of the rim flanks in the region of the rim base.

Circumferential rovings 29 may be provided in the intersecting region 15 of the rim flanges 6, 7 with the rim well 5 respectively the rim flanks 2, 3 or side walls.

In the lower region of FIG. 9, one can see the mold parting surfaces (contact areas) 55 and 65 and 75 of the two molding devices 51 and 61 and of the auxiliary molding part 70, where the two molding devices 51 and 61 respectively the auxiliary molding part 70 are joined.

FIG. 9 illustrates the state after connecting the selected molding device 51 with the auxiliary molding part 70, and placing fiber layers 21 and reinforcement layers 25 thereon.

Thereafter, the auxiliary molding part 70 may be removed, and the circular device 80 may be placed against the selected molding device 51.

Then, a layer structure results which can already be seen in FIG. 6. After removal of the auxiliary molding part 70, the fiber layers 21-23 and 25 of the protruding reinforcement section 21a, and the correspondingly protruding regions of the fiber layers 25 (substantially) retain their shape due to the inherent stiffness of the prepregs 30 used. Thereafter, the other of the molding devices 61 can be placed onto the (selected) molding device 51 and the circular device 80, so that on the whole, a closed rim profile results for the rim 1. Then, in the region of the rim flange 7, the fiber layer 22 placed on the molding device 61 is pressed against the fiber layer 23 on the circular device 80. In the region of the rim base, the fiber layer 22 is pressed against the reinforcement section 21. Then, the tube 32 inflated in the further process in the interior of the hollow space 10 of the rim 1, reliably presses all the layers against one another and outwardly against the molding devices 51 and 62 and the circular device 80.

The outer surfaces of the finished rim, which are particularly significant for the visual effect, are configured in a high quality, since what are the outside fiber layers 21, 22 and 23 forming the visible layers of the finished rim 1, are each separately pressed full-surface against the corresponding contact surfaces (flank contact surfaces 52, 62 and rim well contact surface 84). The outer varnish coat once again clearly enhances the quality.

FIG. 9 shows the state after placement of a first fiber layer 21 onto the rim contact surface 52 of the selected molding device 51 and the rim base region 74 of the auxiliary molding part 70. Furthermore, reinforcement layers 25 have been placed, contacting the mold surface 14 for forming of the rim base 4 and assuming the corresponding shape. In the FIG. 9 on the left, the mold parting surfaces (contact surfaces) 55 and 75 of the molding device 51 and of the auxiliary molding part 70 are still in contact with one another.

In the radially outside region it can be seen that in the region of the rim flange 6, the fiber layer 21 has been folded over, forming a folded-over and radially inwardly extending section 21b for reinforcing the rim flange 6.

Accordingly, the other of the molding devices 61 is also loaded with fiber layers 22, wherein the fiber layer 22 only extends over the flank contact surface 62. In this spot, a section 22b is likewise folded over in the region of the rim flange 7.

A wall thickness 43 respectively thickness of a ring cover 40a is drawn in in FIG. 9, approximately corresponding to the wall thickness 6a, 6b in the region of the rim flank 2, 3 or of the rim flange 6, 7 (cf. FIG. 7). The wall thickness 43 may be only half of what is shown, or it may measure 2 mm, 3 mm, 4 mm, or 5 mm or 6 mm.

The wall thickness 43 lies, in particular, in the range between 1/10 and 10 times the minimum wall thickness 5a of the rim base 5 and/or it may preferably lie between 0.1 mm and 10 mm. In particularly preferred configurations, the thickness 43 lies between 1 mm and 6 mm and particularly preferably e.g. around 4 mm+/−2 mm.

Thereafter, the auxiliary molding part 70 is carefully removed, and the other of the molding devices 61 is approached with the mold parting surface 65 to the mold parting surface 55 of the (selected) molding device 51, where they are attached to one another. Preferably, however, this is done after the ring device 80 or circular device 80 (in FIG. 9 illustrated above) has been placed onto the selected molding device 51.

In all the configurations, the various fiber layers may be placed on top of one another at various angles relative to one another. Thus, in one layer the fibers (warp fibers or weft fibers of a woven material) may be aligned at 30°, 60° or 45° to the peripheral direction of the finished rim. In a layer disposed on top thereof, the corresponding fibers may be aligned at another angle (e.g. another of the angles listed).

While hardening, the varnish coats 52a and 62a bond with the rim walls, and they can in turn be readily detached in removal from the (metallic) walls 52, 62 of the molding devices.

On the whole, the invention provides an advantageous method and an advantageous tool device, with which to manufacture rims 1 showing a reproducible, high quality. It is possible to provide a high surface quality of the outwardly visible surfaces, without complex refinishing work. A later, additional application of a varnish coat or the like is not required. This is made possible for example by the fact that the outwardly visible layers of all of the outside surfaces can be pressed immediately and directly on the corresponding varnish coats on the mold surfaces of the tool device.

The manufacturing method is simple and thus avoids defects, and reduces the reject rate.

The invention allows manufacturing of high quality rims directly out of the mold, achieving good scratch resistance and weathering resistance. Minor flaws are considerably reduced. This is why subsequent repairs can be dispensed with as a rule. The method according to the application dispenses with the time-consuming and cost-intensive subsequent varnish coating of the components. The visual appearance, haptics, and the mechanical properties, as well as the UV resistance, scratch resistance or chemical resistance can be improved. The film thickness applied can be thin (and thinner), which is ideal for lightweight construction. The surface can be manufactured absent any pinholes. A complex, subsequent surface pretreatment with fillers and primers following the removal of the rim from the manufacturing mold can be dispensed with. Cost reduction ensues from time saved since subsequent and separate later coating is omitted. The adhesion between the component and "varnish" is excellent, and results in high mechanical resistance, high climatic resistance, and a high degree of UV protection for the rim. A saleable surface "out of the mold" can be achieved, requiring virtually no finishing work (grinding/putty/varnish). The result shows a high degree of efficiency and a lower weight due to reduced film thicknesses. The adhesion of the varnish to the rim can be improved. This also results in reduced susceptibility to scratches in the surface and an improved decal adhesion. Moreover, the reproducibility can be improved. The resulting ecobalance is improved as well.

While a particular embodiment of the present rim, and method of manufacturing a rim have been described herein, it will be appreciated by those skilled in the art that changes and modifications may be made thereto without departing from the invention in its broader aspects and as set forth in the following claims.

LIST OF REFERENCE NUMERALS

| | |
|---|---|
| 1 | rim |
| 2, 3 | rim flank, rim side wall |
| 2a | varnish coat thickness |
| 4 | rim base |
| 5 | rim well |
| 5a | minimum wall thickness |
| 6, 7 | rim flange |
| 8, 9 | visible surface |
| 10 | hollow space |
| 11 | axis of symmetry |
| 14 | mold surface for forming the rim base |
| 15 | intersecting region |
| 16 | spoke hole |
| 20 | fibrous composite material |
| 21 | fiber layer, visible layer |
| 21a | reinforcement section |
| 21b | folded-over section |
| 22 | fiber layer, visible layer |
| 22b | folded-over section |
| 23 | fiber layer, visible layer |
| 24 | fiber layer |
| 25 | reinforcement layer |
| 29 | roving |
| 30 | prepreg |
| 32 | tube |
| 33-35 | varnish layer |
| 36 | resulting varnish coat |
| 40 | cover |
| 40a | ring cover |
| 40b | material of 40a |
| 41 | pressing ring |
| 42 | pressing ring |
| 43 | thickness |
| 50 | tool device |
| 50a-c | tool component |
| 51 | molding device |
| 51a | molding unit |
| 52 | flank contact surface |
| 52a | varnish coat |
| 54 | rim base region |
| 55 | mold parting surface |
| 56 | fastener |
| 57 | alignment unit |
| 61 | molding device |
| 61a | molding unit |
| 62 | flank contact surface |
| 62a | varnish coat |
| 64 | rim base region |
| 65 | mold parting surface |
| 67 | alignment unit |
| 70 | auxiliary molding part |
| 74 | rim base region |
| 75 | mold parting surface |
| 77 | alignment unit |
| 80 | circular device, ring device |
| 80a | annular unit, core |
| 80b | material of 80a |
| 81-83 | annular segments |
| 84 | rim well contact surface |
| 85, 86 | annular segments |
| 87 | alignment unit |
| 90 | locking ring |
| 91 | clamping portion |
| 100 | bicycle |
| 101 | wheel, front wheel |
| 102 | wheel, rear wheel |
| 103 | frame |
| 104 | fork, suspension fork |
| 105 | rear wheel damper |
| 106 | handlebar |
| 107 | saddle |
| 109 | spoke |
| 110 | hub |
| 112 | pedal crank |

The invention claimed is:

1. A method of manufacturing a rim from a fibrous composite material for bicycle wheels equipped with a disk brake, employing a tool device, wherein the tool device comprises: a plurality of tool components, wherein the tool components comprise two molding devices and one circular device, wherein the molding devices each comprise a flank contact surface for forming a lateral rim flank, and the circular device comprises a rim well contact surface, with the following steps:
at least part of the tool components is provided, and a first varnish coat is applied to at least one rim contact surface on the tool components;
the first varnish coat is dried;
a first fiber layer of the fibrous composite material is applied to the flank contact surface of the molding devices, forming outer fiber layers of at least the greater part of a visible surface of the rim flanks;
at least one first fiber layer of the fibrous composite material is applied to the circular device, which forms a rim well;
the tool components of the tool device are interconnected, and the tool device is closed/locked;
the tool device is heated up, and the varnish coat firmly bonds with the fibrous composite material as it hardens, forming the outermost layer and an outer layer of the rim; and
the tool device is cooled down, and the rim is removed, and spoke holes are made.

2. The method according to claim 1, wherein the molding devices with the flank contact surfaces are provided, and a first varnish coat is applied to the flank contact surfaces of the molding devices, forming on the rim the outermost surface of at least a major part of the rim flanks, and wherein the circular device is also first provided with at least one varnish coat.

3. The method according to claim 1, wherein at least two or three varnish coats are applied successively, and wherein following application, the varnish coat is first dried respectively hardened.

4. The method according to claim 1, wherein the varnish coats are applied at a temperature of the tool components between 10° C. and 80° C.

5. The method according to claim 1, wherein a total thickness of the resulting varnish coat is thinner than 0.7 mm, and wherein a dry weight of the varnish coat is less than 7 grams, and wherein a weight ratio of the dry weight of the varnish coat to the total weight of the rim is less than 1.5%.

6. The method according to claim 1, wherein at least one varnish is used which is taken from a group of varnishes including 1-pack and 2-pack varnishes, varnish coats based on isophthalic acid and/or neopentyl glycol, polyurethane coating, and varnishes based on acrylic resin.

7. The method according to claim 1, wherein at least one pattern is applied or incorporated by means of at least two spray nozzles, and wherein a type code or a color pattern is incorporated.

8. The method according to claim 1, wherein the tool device for hardening the fibrous composite material and for bonding with the varnish coat is temperature-controlled to a temperature between 100° C. and 150° C.

9. The method according to claim 1, wherein the following steps are carried out additionally:
- after applying the varnish coat, one molding device of the two molding devices is selected and provided, and the first fiber layer of the fibrous composite material is applied to the flank contact surface of the selected molding device, which, constituting a visible layer, forms at least a major part of a visible surface of the pertaining rim flank;
- the other of the molding devices is provided, and at least one first fiber layer of the fibrous composite material is applied to the flank contact surface of the other of the molding devices, which, constituting a visible layer, forms at least a major part of a visible surface of the other of the rim flanks;
- at least one first fiber layer of the fibrous composite material is applied to the circular device, which comprises a circumferential rim well contact surface, forming a rim well; and
- the circular device is placed against one of the molding devices, and the other of the molding devices is placed against it, and the circular device and the molding devices are connected with one another.

10. The method according to claim 1, wherein rim flanges are configured on the two rim flanks, and wherein one rim flange is formed by fiber layers, which are applied to one of the molding devices and to the circular device, and wherein one fiber layer on at least one rim flange is folded over at a radially outward edge and is radially folded back inwardly.

11. The method according to claim 1, wherein all the visible surfaces on the rim are formed by the two molding devices and the circular device.

12. The method according to claim 1, wherein the tool device loaded with the at least one fiber layer is evacuated, and wherein the tool device is inserted into a pressure device and heated.

13. A rim for at least partially muscle-powered vehicles and in particular bicycles with opposite rim flanks, a rim well and a rim base, where the rim flanks meet in the radially most inwardly point, manufactured from at least one fibrous composite material by way of the method according to claim 1, and wherein the outer surface that is visible in operation as intended, is at least predominantly formed of the varnish coat, which was inserted into the manufacturing mold prior to inserting the at least one fibrous composite material, and wherein the outer surface visible in operation as intended, does not, at least predominantly, comprise a varnish coat applied after removal from the manufacturing mold.

14. The method according to claim 9, wherein all of the fiber layers, which in use as intended form the visible surfaces as visible layers, are pressed on the molding devices and the circular device of the tool device, to ensure full-surface contact between the fiber layers and the flank contact surfaces, and to prevent flaws on the visible surface.

15. The method according to claim 9, wherein an auxiliary molding part of the tool device matching the selected molding device is connected with the selected molding device, so that the selected molding device together with the auxiliary molding part forms a mold surface for a rim base, circling an axis of symmetry of the rim, which is configured in sections on the selected molding device, and in sections, on the auxiliary molding part, and wherein the first fiber layer is not only applied to the flank contact surface of the selected molding device, but also to a rim base region of the auxiliary molding part, to form a continuous first fiber layer in the rim base region, and wherein the auxiliary molding part is thereafter removed from the selected molding device, and wherein the two molding devices covered with fiber layers are interconnected,
- and wherein the first fiber layer applied to the selected molding device, forms the visible layer with the visible surface of the pertaining rim flank in a region of the flank contact surface, and in the rim base region of the auxiliary molding part, forms a reinforcement layer of the rim base but does not form the visible layer with the visible surface of the other of the rim flanks.

16. The method according to claim 15, wherein the two molding devices and the auxiliary molding part each have a mold parting surface running perpendicular to the axis of symmetry of the rim, where they are selectively placed against one another.

17. A method of manufacturing a bicycle component from a fibrous composite material for a bicycle, employing a tool device, wherein the tool device comprises: a plurality of tool components, wherein the tool components comprise two molding devices, wherein the molding devices each comprise a contact surface for contacting the bicycle component, the method including the following steps:
- at least part of the tool components is provided, and a first varnish coat is applied to at least one contact surface on the tool components;
- the first varnish coat is dried;
- a first fiber layer of the fibrous composite material is applied to the contact surface of the molding devices, forming the outer fiber layers of at least the greater part of a visible surface of the bicycle component;
- the tool components of the tool device are interconnected, and the tool device is closed/locked;
- the tool device is heated up, and the varnish coat firmly bonds with the hardening fibrous composite material; and
- the tool device is cooled down, and the bicycle component is removed.

* * * * *